United States Patent
Hardy et al.

(10) Patent No.: US 8,583,500 B2
(45) Date of Patent: Nov. 12, 2013

(54) SYSTEMS AND METHODS FOR PROVIDING COMPUTING DEVICE COUNTS

(75) Inventors: Michael Hardy, Lawrenceville, GA (US); John DeCastra, Birmingham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1507 days.

(21) Appl. No.: 11/832,289

(22) Filed: Aug. 1, 2007

(65) Prior Publication Data
US 2009/0037200 A1 Feb. 5, 2009

(51) Int. Cl.
*G06F 17/00* (2006.01)

(52) U.S. Cl.
USPC .......................................................... 705/22

(58) Field of Classification Search
USPC ........................................................ 705/7, 22
See application file for complete search history.

(56) References Cited

U.S. PATENT DOCUMENTS

| | | | |
|---|---|---|---|
| 2004/0062370 A1* | 4/2004 | O'Neal et al. | 379/112.01 |
| 2008/0049779 A1* | 2/2008 | Hopmann et al. | 370/431 |
| 2009/0019141 A1* | 1/2009 | Bush et al. | 709/223 |

* cited by examiner

*Primary Examiner* — Thomas Dixon
(74) *Attorney, Agent, or Firm* — Scott P. Zimmerman, PLLC

(57) ABSTRACT

Methods, systems, and computer-readable media for providing computing device counts are disclosed. Exemplary methods include providing a count of computing devices corresponding to an organization, the count of computing devices being responsive to data corresponding to the computing devices, providing a time period for which the count is valid, and providing information on how the computing device count was determined.

17 Claims, 7 Drawing Sheets

400

FROM STEP 405,
Figure 4A

PROCESS THE COMPUTING DEVICE RECORDS TO ACCOUNT FOR DUPLICATE LISTINGS IN THE COMPUTING DEVICE RECORDS     406

DETERMINE A COMPUTING DEVICE COUNT BASED ON THE COMPUTING DEVICE RECORD PROCESSING     407

ADJUST THE COMPUTING DEVICE COUNT BASED ON DATA IDENTIFYING COMPUTING DEVICES BEING REPLACED     408

END

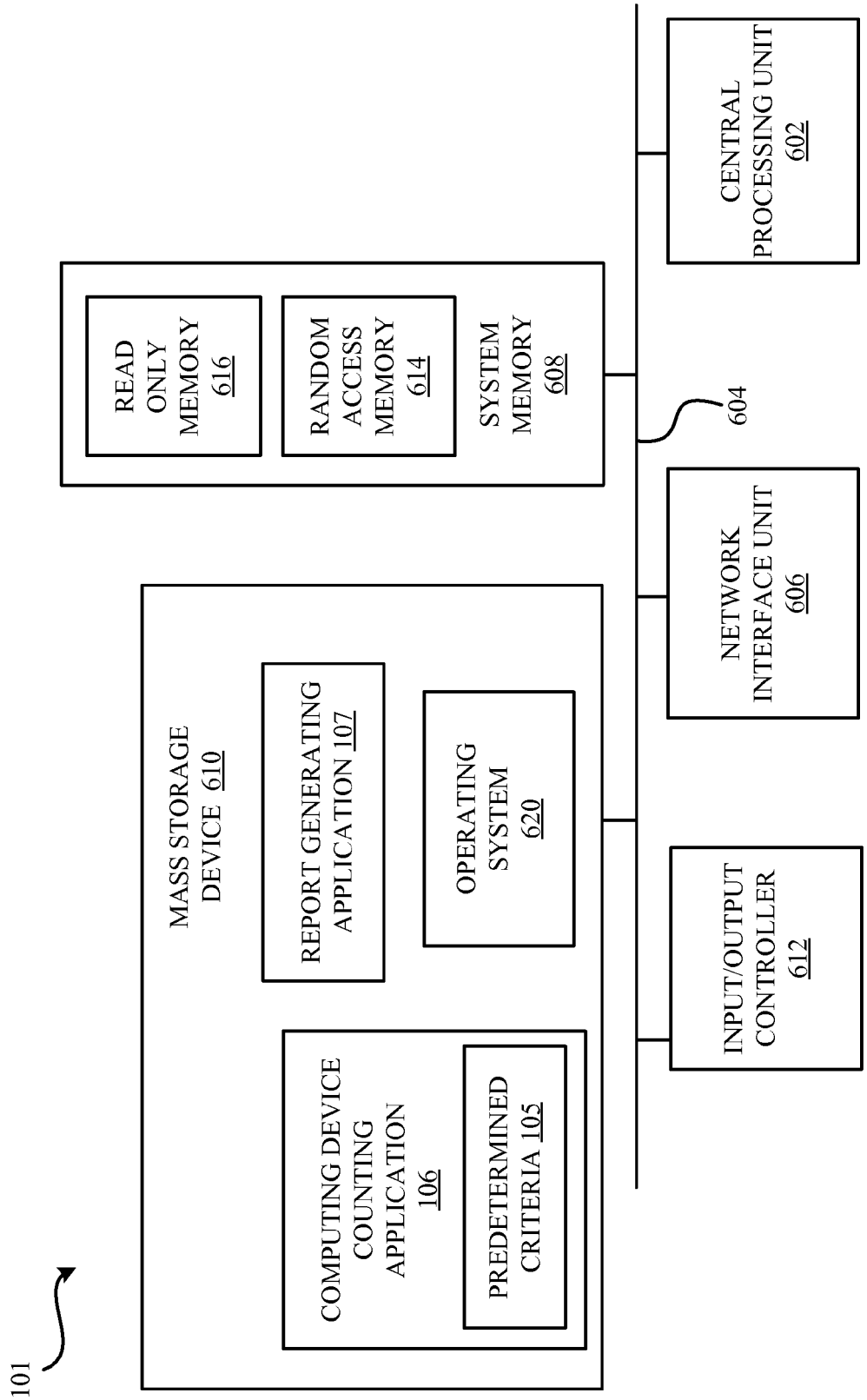

SYSTEMS AND METHODS FOR PROVIDING COMPUTING DEVICE COUNTS

TECHNICAL FIELD

This application relates generally to the field of computing devices. More specifically, this application relates to systems and methods for providing counts of computing devices.

BACKGROUND

Having an accurate count of computing devices in an entity is useful for computer system fitness, software billing, and security compliance reporting purposes. There are numerous data sources indicating computing device counts in an entity as well as different uses for such counts. Increasing demands for accurate computing device counts have spotlighted significant variations in computing device counts and computing device count methodology within a company. There is often no clear explanation that is readily available to account for these variations. Often, requests for verification and reconciliation of computing device counts can be very time consuming. Furthermore, confusion and uncertainty is created when different computing device counts are provided by different persons or departments within a company. In the past, certain computing device count data has been accepted over other computing device count data based solely on which employee or department provided the data. Furthermore, computing device counts are often published or included in reports without an understanding how the computing device counts were obtained.

SUMMARY

Exemplary embodiments of systems, methods, and computer program products for providing computing device counts are described. One such method includes providing a count of computing devices corresponding to an organization, the count of computing devices being responsive to data corresponding to the computing devices, providing a time period for which the count is valid, and providing information on how the computing device count was determined.

A system for providing computing device counts includes a processor and memory having instructions stored in the memory. The instructions are configured to enable the processor to provide a count of computing devices corresponding to an organization, a time period for which the count is valid, and information on how the computing device count was determined.

A computer-readable storage medium includes computer-readable instructions configured to enable a computer to provide a count of computing devices corresponding to an organization, a time period for which the count is valid, and information on how the computing device count was determined.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 6 is a block diagram illustrating a computing device counting system depicted in FIG. 1, in accordance with exemplary embodiments.

DETAILED DESCRIPTION

Figure 1:
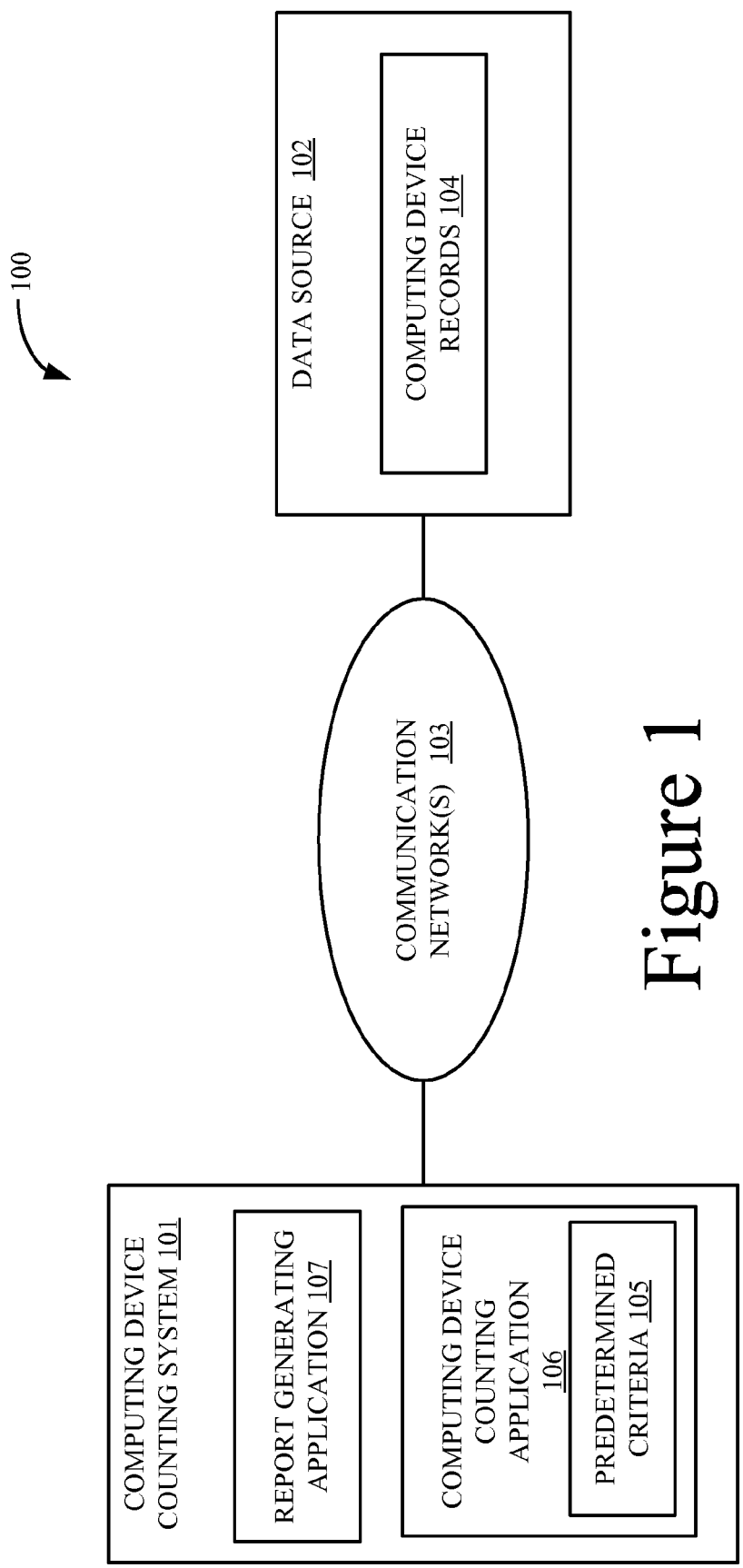
FIG. 1 is a block diagram illustrating a communication system, in accordance with exemplary embodiments.

The following detailed description is directed to methods, systems, and computer-readable media for providing computing device counts. In the following detailed description, references are made to the accompanying drawings that form a part hereof, and which are shown by way of exemplary embodiments and implementations.

Exemplary embodiments utilize data sources, data gathering tools, and data manipulation processes for providing accurate counts of computing devices for an organization. Note that the systems and methods disclosed herein may also be used to provide accurate counts for other devices or elements for which counts are desired. By properly defining the data sources, data gathering tools, and data manipulation processes, the computing device counts can be easily audited and verified. Each computing device count may have one or more specified uses including, for example, for billing and/or software compliance purposes. As used herein, a computing device may be, for example, a desktop computer, a notebook computer, a server, a network router, a network switch, a specialized computing device, a mobile computing device, or any other device that uses a processor capable of executing instructions. Illustrative examples of computing device counts include:

- A count of active servers and/or user-computing devices corresponding to a company or a particular division of the company.
- A count of servers and/or user-computing devices that are serviced by a certain software program and/or software provider.
- A count of servers and/or user-computing devices that include a certain software program.
- A count of active servers and/or user-computing devices relevant to compliance reporting in connection with a particular software.

According to exemplary embodiments, a computing device counting process can be certified to assure a reader of computing device count data that a certain corresponding counting process was used to arrive at the computing device count. Approved uses of computing device counts can be specified as part of a computing device count certification process. A given computing device count can then be used in various reports, as appropriate. The various uses or reports may have differing tolerances for the age of a given computing device count.

According to exemplary embodiments, a report may indicate which computing device counts in the report are certified. Noting that a computing device count is certified may result in a report reader being confident in the accuracy of the computing device count. Furthermore, inclusion of the date and/or age tolerances of the computing device count can help a reader determine if the computing device count is still valid and/or reliable. The reader may also be provided with information to help the reader understand the scope of the computing device count and the methodology that generated such count. This information may be provided in the report or via another source such as, for example, a company web-site. Such a web-site may also provide other information related to various certified computing device counts including approved uses for respective counts. For example, the web-site may list reports in which each certified computing device count may be used. A query-based interface may be used to retrieve information regarding various certified computing device counts and the reports in which such counts may be used.

FIG. 1 is a block diagram depicting a communication system 100. The communication system 100 includes a computing device counting system 101 and a data source 102 that are coupled via one or more the computer networks 103. The computer networks 103 may include, for example, a local area network (LAN) and/or a wide area network (WAN). The computing device counting system 101 retrieves computing device records 104 from the data source 102 and uses the computing device records 104 to determine one or more computing device counts for an organization, according to exemplary embodiments. The computing device counts may be based on predetermined criteria 105 for the computing device counts, as will be discussed in more detail below. The computing device counting system 101 optionally includes a report generating application 107 for generating reports which include one or more computing device counts determined by the computing device counting system 101. Alternatively, the report generating application 107 may be implemented by the data source 102 or by a different computing device (not shown in FIG. 1).

Note that although only one data source, the data source 102, is shown in FIG. 1, exemplary embodiments include communication systems, such as the communication system 100, having two or more of the data sources 102 for providing the respective computing device records 104 to the computing device counting system 101. The computing device records 104 may also be provided to the computing device counting system 101 via alternative means such as, for example, computer readable storage media or a source directly associated with the computing device counting system 101.

The computing device records 104 provided by the data sources 102 may be in the form of databases, spreadsheets, and/or some other type of data structures. Information provided by the computing device records 104 regarding a particular computing device may include, for example, among others, the type of computing device (e.g., desktop vs. notebook and/or server vs. user-computing device), one or more performance characteristics of the computing device (e.g., processor speed and/or memory capacity), operating system type and/or version installed on the computing device, other software types and/or versions installed on the computing device, when the computing device has been active, whether the computing device is being replaced, a date and/or time the computing device was logged into a particular system, whether and how the computing device is compliant with security requirements, whether and/or when certain software upgrades and/or patches were implemented regarding particular computing device software, a date and/or time the computing device was scanned by a particular software (e.g., computer management or computer security software), business unit to which the computing device is assigned, and/or a company that is performing one or more billable services in connection with the computing device.

Illustrative non-limiting examples of software that may be used to provide the computing devices records 104 include: Active Directory™ (AD), Microsoft Systems Management Server™ (SMS), Eracent™, Nessus™, REM™, Excel™, and MSM™.

Illustrative non-limiting examples, among other, of tools for retrieving data from the data source 102 include SMS Web Reporting™, Eracent Reporting™, Structured Query Language (SQL) Server Database™ (DB), SQL Server Reporting Services™, Oracle DB™, SQL™ queries, and application programming interface (API) calls.

Figure 2:
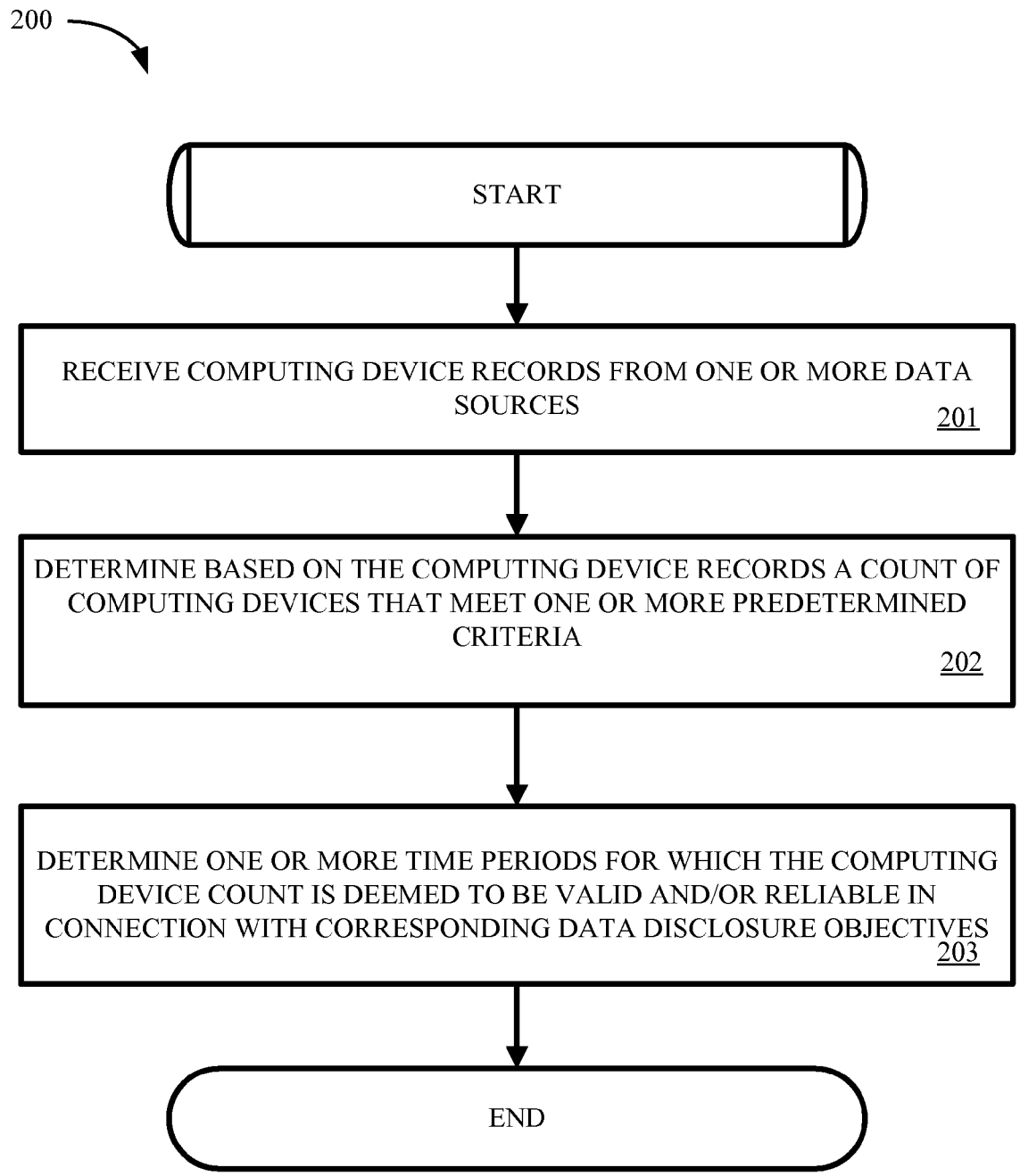
FIG. 2 is a flow chart depicting a computing device counting method, in accordance with exemplary embodiments.

FIG. 2 is a flow chart depicting a computing device counting method 200, in accordance with exemplary embodiments. As indicated in box 201, the computing device records 104 are received at the computing device counting system 101 from one or more of the data sources 102. The computing device counting system 101 may periodically request the computing device records 104 from the data source 102, automatically receive the data records 104 from the data source 102, and/or request the computing device records 104 from the data source 102 in response to a request received at the computing device counting system 101. The computing device records 104 provided by the data source 102 may be in the form of databases, spreadsheets, and/or some other data structures. A count of computing devices that meets one or more predetermined criteria 105 is then determined by the computing device counting application 106 based on the computing device records 104, as indicated in box 202. The predetermined criteria 105 may include, for example, a type of computing device, a time period since a computing device was determined to have been active, a type of software used to manage a computing device, and/or a type of software installed on a computing device, and/or a provider of a type of software used by or in connection with a computing device. Note that there may be different sets of predetermined criteria 105 for various respective computing device counting purposes.

In accordance with exemplary embodiments, the computing device counting application 106 may determine a count of computing devices using any or a combination of a variety of approaches. For example, the computing device counting application 106 may filter out computing device record entries not meeting each of the predetermined criteria 105 and then count the remaining computing device record entries. Alternatively, the computing device counting application may flag computing device record entries that meet the predetermined criteria 105 and then count them. As another example, the computing device counting application 106 may flag computing device record entries that do not meet the predetermined criteria 105 and then count the non-flagged computing device record entries. As yet another example, the computing device counting application may use a combination of filtering and flagging to help determine a computing device count.

One or more time periods are then determined for which the computing device count is deemed to be valid and/or reliable in connection with corresponding disclosure objectives, as indicated in box 203. The time period determination may be performed by a user of the computing device counting system 101, by the computing device counting application 106, or by the report generating application 107. An actual number of computing devices being counted can be very dynamic due to computing devices being added to a system, computing devices being removed from a system, client reporting schedules, and record processing schedules. Therefore, a time period for which a computing device count is deemed valid and/or reliable depends on an intended use of the computing device count. The time period may be based on a requirement in a software licensing contract, on a computer security requirement, on a software billing schedule and/or on how fixed or dynamic a particular computing device count is expected to be. Non-limiting examples of time periods for which a computing device count is determined to be reliable include, among others, a day, a week, a month, or a year.

Figure 3:
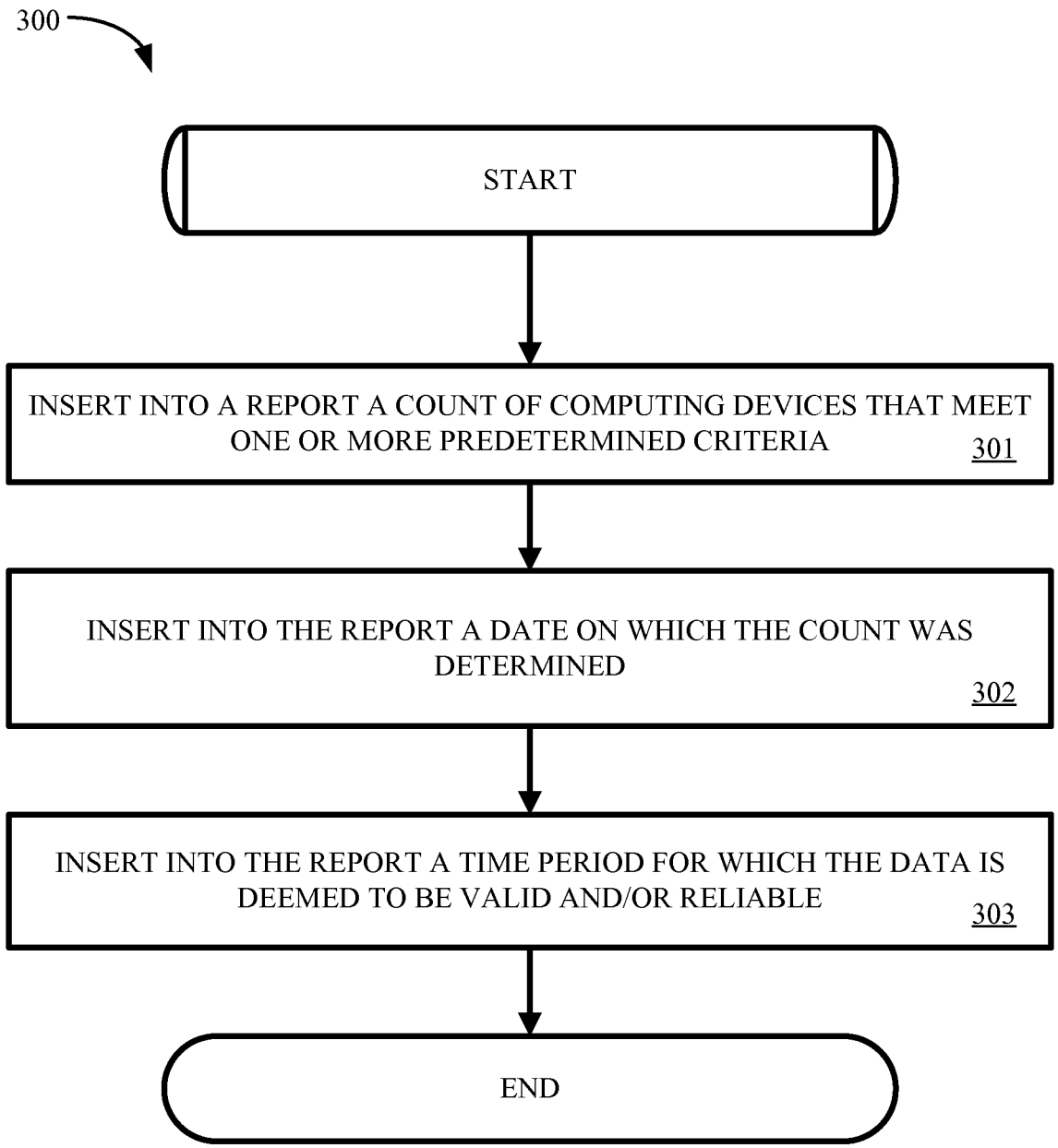
FIG. 3 is a flow chart depicting a reporting method, in accordance with exemplary embodiments.

FIG. 3 is a flow chart depicting a reporting method 300, in accordance with exemplary embodiments. As indicated in box 301, a count of computing devices that meet one or more predetermined criteria 105 is inserted into a report. A date on which the count was determined and time period for which the data is deemed to be reliable are also inserted into the report, as indicated in boxes 302 and 303, respectively. Each of the steps 301-303 may be implemented via, for example, the report generating application 107 that may be executed by the computing device counting system 101 or by another computing device.

The date and time period associated with a computing device count can help a reader determine when or whether a computing device count is valid and/or reliable. Furthermore, an "as of," date corresponding to a date the computing device count was calculated can be associated with the computing device count. The "as of" date enables a reader of the computing device count to better determine whether a corresponding computing device count is still valid and/or reliable in connection with a certain context within which the computing device count is being used.

Figure 4A:
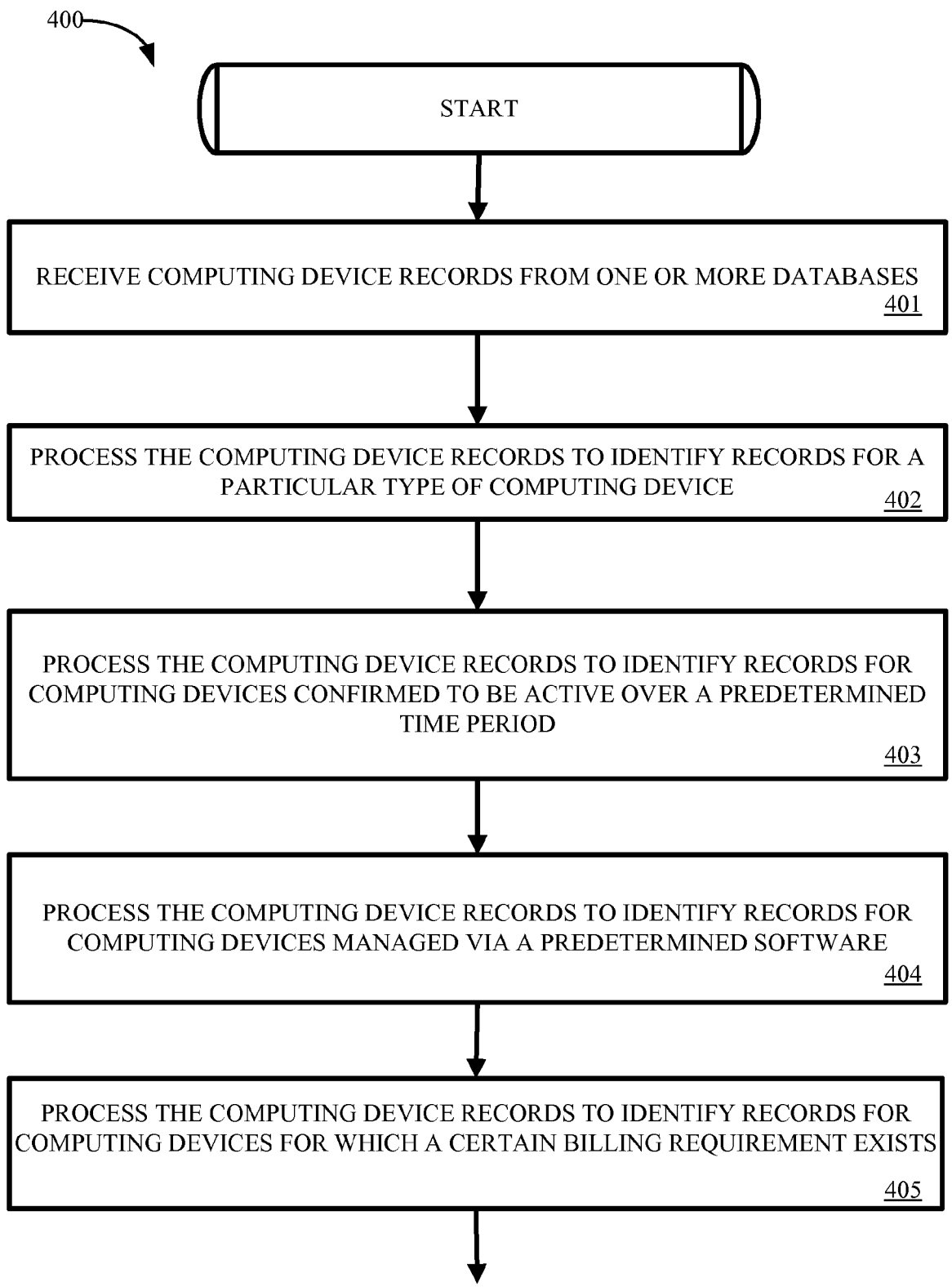
FIGS. 4A and 4B combine to form a flow chart depicting a computing device counting method, in accordance with exemplary embodiments.
Figure 4B:
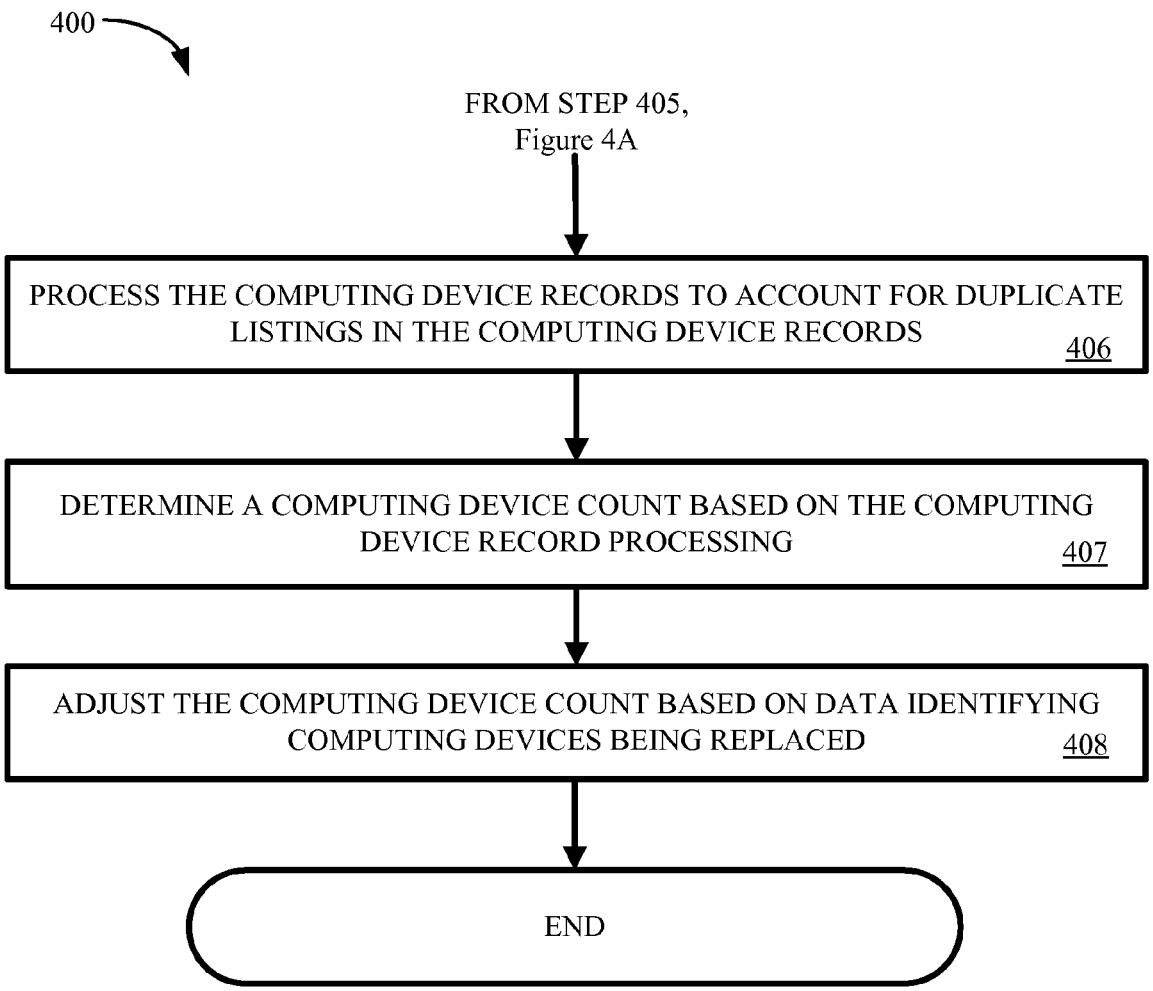

FIGS. 4A and 4B combine to form a flow chart depicting a computing device counting method 400, in accordance with exemplary embodiments. The steps in the counting method 400 may be performed by, for example, the computing device counting application 106. As indicated in box 401, the computing device records 104 are received from one or more data sources 102. The received computing device records 104 are processed to identify records for a particular type of computing device, as indicated in box 402. Types of computing devices based on which computing device records may be identified include, for example, desktop computers, notebook computers, user-computing devices, servers, network routers, network switches, and mobile computing devices. The computing device records 104 are further processed to identify records for computing devices confirmed to be active over a predetermined time period, as indicated in box 403. A computing device can be confirmed to be active based on, for example, whether a computing device user used the computing device to log into a particular system or whether the computing device was scanned by a particular server or software within the predetermined time period.

The computing device records 104 are then processed to identify the records 104 for computing devices managed via a predetermined software, as indicated in box 404. The computing device records 104 are further processed to identify records for computing devices for which a certain billing requirement exists, as indicated in box 405. Identifying records based on billing requirements can be performed when a computing device count is to be used for billing purposes.

The computing device records 104 are then processed to account for duplicate listings in the computing device records 104, as indicated in box 406. Accounting for duplicate listings helps to prevent computing device counts from being inaccurate due to double-counting. A computing device count is then determined based on the computing device record processing, as indicated in box 407. For example, certain of the computing device records 104 not meeting certain criteria are eliminated or flagged such that the records are excluded from a computing device count.

The computing device count is then adjusted based on data identifying computing devices being replaced, as indicated in box 408. For example, when a computing device is being replaced, the computing device and the computing device's replacement may both be active even though the computing device being replaced may soon be deactivated and may no longer be relevant to various computing device counts. Therefore, accounting for computing device replacements can help provide a more accurate count of computing devices for various purposes including, for example, software licensing. A computing device being replaced and a corresponding replacement computing device may be identified as such in the computing device records 104.

Figure 5:
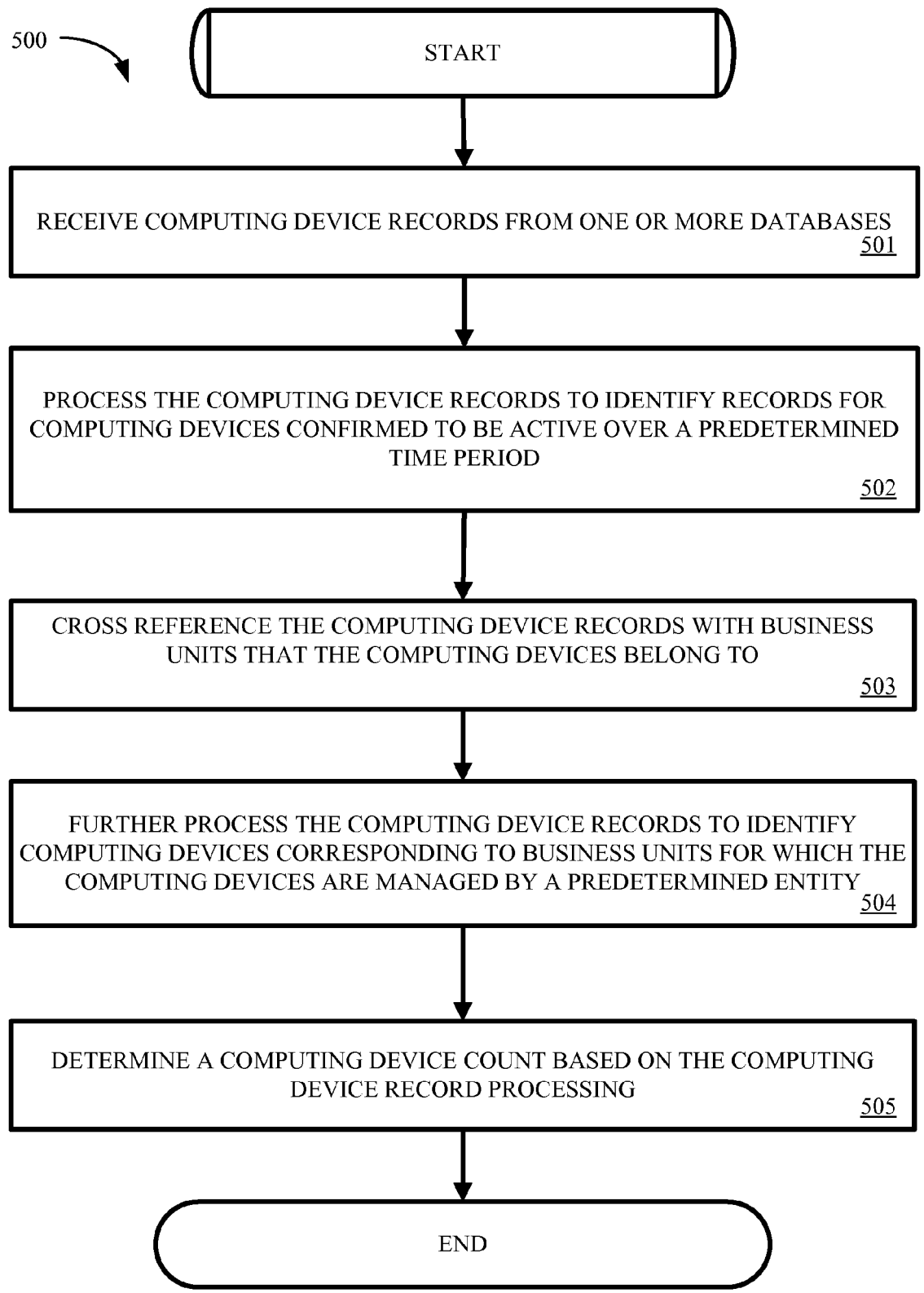
FIG. 5 is a flow chart depicting another computing device counting method, in accordance with exemplary embodiments.

FIG. 5 is a flow chart depicting a computing device counting method 500, in accordance with exemplary embodiments. The steps in the counting method 500 may be performed by, for example, the computing device counting application 106. As indicated in box 501, the computing device records 104 are received from one or more data sources 102. The computing device records 104 are processed to identify records for computing devices confirmed to be active over a predetermined time period, as indicated in box 502. The computing device records 104 are cross referenced with business units that the computing devices belong to, as indicated in box 503. The computing device records 104 are further processed to identify computing devices corresponding to business units for which the computing devices are managed by a predetermined entity, as indicated in box 504. A computing device count based on the computing device record processing is then determined, as indicated in box 505.

Note that methods depicted in the exemplary flow charts described above may be modified to include fewer, additional, and/or different steps within the scope of this disclosure. Furthermore, steps depicted in the flow charts may be performed out of the order shown including substantially concurrently, in reverse order, or in a substantially different order.

FIG. 6 is a block diagram illustrating the computing device counting system 101, in accordance with exemplary embodiments. The system 101 includes a central processing unit 602 (CPU), a system memory 608, including a random access memory 614 (RAM) and a read-only memory (ROM) 616, and a system bus 604 that couples the memory 608 to the CPU 602. A basic input/output system containing the basic routines that help to transfer information between elements within the system 101, such as during startup, is stored in the ROM 616. The system 101 further includes a mass storage device 610 for storing an operating system 620 and other program modules, which will be described in greater detail below.

The mass storage device 610 is connected to the CPU 602 through a mass storage controller (not shown) connected to the bus 604. The mass storage device 610 and its associated computer-readable media provide non-volatile storage for the server 101. Although the description of computer-readable media contained herein refers to a mass storage device, such as a hard disk or CD-ROM drive, it should be appreciated by those skilled in the art that computer-readable media can be any available media that can be accessed by the server 101.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the server 101.

According to various embodiments, the system 101 may operate in a networked environment using logical connections to remote computers and data sources 102, through a network, such as the communications network 103. The system 101 may connect to the network 103 through a network interface unit 606 connected to the bus 604. It should be appreciated that the network interface unit 606 may also be utilized to connect to other types of networks and remote computer systems. The system 101 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the system 101, including the operating system 620 suitable for controlling the operation of the system 101. The mass storage device 610 and RAM 614 may also store one or more program modules. In particular, the mass storage device 610 and the RAM 614 may store a computing device counting application 106. Functionality provided by the computing device counting application 106 includes, for example, retrieving computing device records, such as the computing device records 104, and analyzing such records to determine counts of computing devices that meet certain criteria. The computing device counting application 106 may also be configured to store and provide information on how various computing device counts were determined and during what time periods such computing device counts are deemed to be valid. Other program modules may also be stored in the mass storage device 610 and utilized by the system 101.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims. Various modifications and changes may be made to the subject matter described herein without following the example embodiments and applications illustrated and described, and without departing from the true spirit and scope of the embodiments, which is set forth in the following claims.

What is claimed is:

1. A computer-implemented method for providing computing device counts, comprising:
   auditing computing devices executing a software program under license from a software provider;
   retrieving computing device records associated with an organization that are stored in memory;
   filtering the computing device records to remove records not associated with the software program;
   counting servers associated with the organization that store the software program to provide a numerical count of computing devices executing the software program;
   counting mobile devices associated with the organization that store the software program to provide the numerical count of the computing devices executing the software program;
   determining replacement of one of the computing devices executing the software program;
   identifying a replacement device that replaces the one of the computing devices;
   identifying both the one of the computing devices and the replacement device in the computing device records;
   identifying a double-count between the one of the computing devices and the replacement device in the computing device records;
   adjusting the double-count in the numerical count of computing devices;
   providing a time period for which the numerical count is valid;
   providing information on how the numerical count was determined;
   publishing the numerical count to a website; and
   listing reports in the website for which the numerical count may be used.

2. The method of claim 1, further comprising counting notebook computers associated with the organization that store the software program to provide the numerical count of the computing devices executing the software program.

3. The method of claim 1, further comprising filtering the computing device records to remove records not associated with a version of the software program.

4. The method of claim 1, further comprising filtering the computing device records to remove records not associated with an operating system that executes the software program.

5. The method of claim 1, further comprising reporting the time period to the website.

6. The method of claim 1, further comprising reporting a date to the website on which the numerical count was generated.

7. The method of claim 1, further comprising billing an amount responsive to the numerical count.

8. A system for providing computing device counts, comprising:
   a processor; and
   memory storing instructions that when executed causes the processor to perform operations, the operations comprising:
   auditing computing devices executing a software program under license from a software provider;
   retrieving computing device records associated with an organization;
   filtering the computing device records to remove records not associated with the software program;
   counting servers associated with the organization that store the software program to provide a numerical count of computing devices executing the software program;
   counting mobile devices associated with the organization that store the software program to provide the numerical count of the computing devices executing the software program;
   determining replacement of one of the computing devices executing the software program;
   identifying a replacement device that replaces the one of the computing devices;
   identifying both the one of the computing devices and the replacement device in the computing device records;
   identifying a double-count between the one of the computing devices and the replacement device in the computing device records;

adjusting the double-count in the numerical count of computing devices;

providing a time period for which the numerical count is valid;

providing information on how the numerical count was determined;

publishing the numerical count to a website; and listing reports in the website for which the numerical count may be used.

9. The system of claim 8, wherein the operations further comprise counting notebook computers associated with the organization that store the software program to provide the numerical count of the computing devices executing the software program.

10. The system of claim 8, wherein the operations further comprise filtering the computing device records to remove records not associated with a version of the software program.

11. The system of claim 8, wherein the operations further comprise filtering the computing device records to remove records not associated with an operating system that executes the software program.

12. The system of claim 8, wherein the operations further comprise reporting the time period to the website.

13. The system of claim 8, wherein the operations further comprise reporting a date on which the numerical count was generated.

14. A memory storing instructions that when executed cause a processor to perform operations, the operations comprising:

auditing computing devices executing a software program under license from a software provider;

retrieving computing device records from memory that are associated with an organization;

filtering the computing device records to remove records not associated with the software program;

counting servers described in filtered computing device records that store the software program to provide a numerical count of computing devices executing the software program;

counting mobile devices described in the filtered computing device records that store the software program to provide the numerical count of the computing devices executing the software program;

determining replacement of one of the computing devices executing the software program;

identifying a replacement device that replaces the one of the computing devices;

identifying both the one of the computing devices and the replacement device in the computing device records;

identifying a double-count between the one of the computing devices and the replacement device in the computing device records;

adjusting the double-count in the numerical count of computing devices;

providing a time period for which the numerical count is valid;

providing information on how the numerical count was determined;

publishing the numerical count to a website; and listing reports in the website for which the numerical count may be used.

15. The memory of claim 14, wherein the operations further comprise counting notebook computers described in the filtered computing device records that store the software program to provide the numerical count of the computing devices executing the software program.

16. The memory of claim 15, wherein the operations further comprise instructions for filtering the computing device records to remove records not associated with a version of the software program.

17. The memory of claim 14, wherein the operations further comprise billing an amount responsive to the numerical count.

\* \* \* \* \*